(12) United States Patent
Mentovich et al.

(10) Patent No.: US 10,855,331 B1
(45) Date of Patent: Dec. 1, 2020

(54) APPARATUSES AND SYSTEMS FOR IMPROVED COPPER CONNECTIONS

(71) Applicant: Mellanox Technologies, Ltd., Yokneam (IL)

(72) Inventors: Elad Mentovich, Tel Aviv (IL); Anna Sandomirsky, Nesher (IL); Itshak Kalifa, Bat Yam (IL); Boaz Atias, Maale Adumim (IL); Eyal Babish, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/685,400

(22) Filed: Nov. 15, 2019

(51) Int. Cl.
*H04B 3/00* (2006.01)
*H04L 25/00* (2006.01)
*H04B 3/02* (2006.01)
*H01R 13/66* (2006.01)
*H01B 1/02* (2006.01)

(52) U.S. Cl.
CPC ........... *H04B 3/02* (2013.01); *H01R 13/6691* (2013.01); *H01B 1/02* (2013.01)

(58) Field of Classification Search
CPC ........ H04B 3/02; H04B 1/02; H01R 13/6691; H04L 12/2801; H04L 65/1073

USPC ......................... 375/219, 220, 222, 257, 258
See application file for complete search history.

(56) References Cited

U.S. PATENT DOCUMENTS

| 8,223,824 B2 * | 7/2012 | Kim .................... H04L 12/2801 |
| | | 375/219 |
| 2013/0024575 A1 * | 1/2013 | Taylor ................. H04L 65/1073 |
| | | 709/227 |

* cited by examiner

*Primary Examiner* — Phuong Phu
(74) *Attorney, Agent, or Firm* — Alston & Bird LLP

(57) ABSTRACT

Apparatuses, systems, and associated methods are described that provide signal transmission over copper media. An example module includes a number of electrical signal generators that each generate an electrical signal, and a signal modulation system that receives the electrical signals generated by the electrical signal generators. The signal modulation system further modulates each of the electrical signals such that each modulated electrical signal is distinguishable from the other modulated electrical signals. The module further includes an active copper multiplexer in electrical communication with the electrical signal generators that receives the modulated electrical signals from the signal modulation system. The active copper multiplexer further combines the multiple modulated signals into a single combined electrical signal and transmits the single combined electrical signal through a single copper cable.

18 Claims, 5 Drawing Sheets

APPARATUSES AND SYSTEMS FOR IMPROVED COPPER CONNECTIONS

TECHNOLOGICAL FIELD

Example embodiments of the present invention relate generally to network connection systems and, more particularly, to systems and apparatuses for data transmission over copper media.

BACKGROUND

Datacenters and other networking systems may include connections between switch systems, servers, racks, and devices in order to provide for signal transmission between one or more of these elements. These connections may be made using cables, transceivers, and connector assemblies that utilize optical, copper, and/or similar transmission mediums. Due to the large number of connections in these environments, copper cabling may be used for connections over short distances in order to minimize cost.

BRIEF SUMMARY

Apparatuses, systems, and associated methods are described for providing improved copper connections. For example, a module for transmitting signals over copper media is provided that includes a plurality of electrical signal generators each configured to generate an electrical signal. The module may include a signal modulation system configured to receive the electrical signals generated by the electrical signal generators and modulate each of the electrical signals such that each modulated electrical signal is distinguishable from the other modulated electrical signals. The module may also include an active copper multiplexer in electrical communication with the plurality of electrical signal generators. The active copper multiplexer may receive a plurality of modulated electrical signals from the signal modulation system, combine the plurality of modulated signals into a single combined electrical signal comprising multiple modulated electrical signals, and transmit the single combined electrical signal through a single copper cable.

In some embodiments, the plurality of electrical signal generators include four electrical signal generators each configured to generate an electrical signal. In such an embodiment, the signal modulation system may be further configured to receive four electrical signals from the four electrical signal generators and modulate each of the four electrical signals.

In some embodiments, each electrical signal may have a bandwidth of at least 25 Gb/s. In such an embodiment, the active copper multiplexer may be further configured to receive the four modulated electrical signals from the signal modulation system and combine the four modulated signals into a single combined electrical signal having a bandwidth of at least 100 Gb/s.

In other embodiments, each electrical signal may have a bandwidth of at least 50 Gb/s. In such an embodiment, the active copper multiplexer may be further configured to receive the four modulated electrical signals from the signal modulation system and combine the four modulated signals into a single combined electrical signal having a bandwidth of at least 200 Gb/s.

A communication system for transmitting signals over copper media is also provided. The communication system may include a first module that includes a first plurality of electrical signal generators that each generate an electrical signal. The first module may further include a first signal modulation system that receives the electrical signals generated by the first electrical signal generators and modulates each of the electrical signals such that each modulated electrical signal is distinguishable from the other modulated electrical signals. The first module may further include a first active copper multiplexer in electrical communication with the plurality of first electrical signal generators. The first active copper multiplexer may receive a plurality of modulated electrical signals from the first signal modulation system and combine the plurality of modulated signals into a first combined electrical signal comprising multiple modulated electrical signals.

The communication system may further include a second module that includes a second plurality of electrical signal generators that each generate an electrical signal. The second module may further include a second signal modulation system that receives the electrical signals generated by the second electrical signal generators and modulates each of the electrical signals such that each modulated electrical signal is distinguishable from the other modulated electrical signals. The second module may also include a second active copper multiplexer in electrical communication with the plurality of second electrical signal generators. The second active copper multiplexer may receive a plurality of modulated electrical signals from the second signal modulation system and combine the plurality of modulated signals into a second combined electrical signal comprising multiple modulated electrical signals. The communication system may also include a system multiplexer. The system multiplexer may receive the first combined electrical signal and the second combined electrical signal from the first and second modules, respectively; combine the first combined electrical signal and the second combined electrical signal into a third combined electrical signal; and transmit the third combined electrical signal through a single copper cable.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

Figure 1:
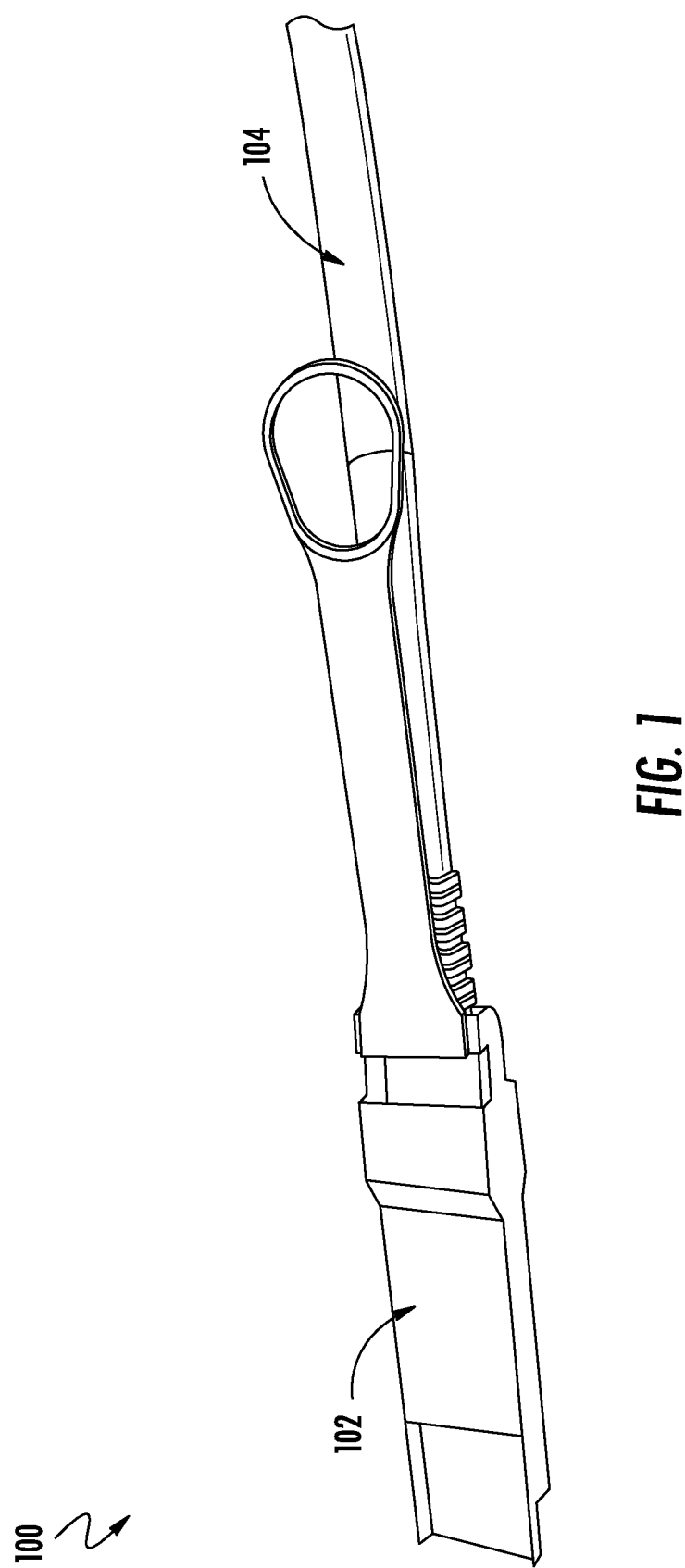
FIG. 1 is a perspective view of a networking cable for implementing some example embodiments described herein.

With reference to FIG. 1, a networking cable 100 is illustrated for use with some embodiments of the present invention. The networking cable 100 may include a cable connector 102 that defines or otherwise supports a copper communication module of the present disclosure. As shown, the cable connector 102 may be configured to connect to, mate with, or otherwise be received by a networking box, datacenter rack, or other networking environment component. The networking cable 100 may include a copper cable 104 configured to allow transmission of electrical signals between the cable connector 102 and one or more other cable connectors (not shown) in electrical communication with the cable connector 102 (e.g., opposite the cable connector 102). By way of example, the networking cable 100 may receive one or more electrical signals from a networking box (not shown) communicably coupled with the cable connector 102. The cable connector 102, via the components of the copper communication modules described hereafter, may direct these electrical signals for transmission by the copper cable 104 to one or more cable connectors (not shown) on the opposite end of the copper cable 104, and vice versa.

As described above, for connections over short distances, copper cables may be used in networking systems to minimize cost. As would be evident to one of ordinary skill in the art in light of the present disclosure, copper cables are often less effective in high bandwidth applications and for connections over long distances. As such, conventional high bandwidth systems rely upon optical communication systems and components to provide sufficient bandwidth capacity for long distance applications. Optical communication components, however, are often expensive and have high power consumption requirements during operation. Traditional attempts at employing copper media in high bandwidth applications have focused on extending the reach or range of these components and, as such, fail to reduce the copper material necessary for these connections. As described hereafter, the embodiments of the present application utilize emerging copper materials and novel signal manipulation techniques to provide copper communication systems with increased bandwidth and reduced material (e.g., by reducing the width of copper cabling).

Copper Communication Modules and Systems

Figure 2:
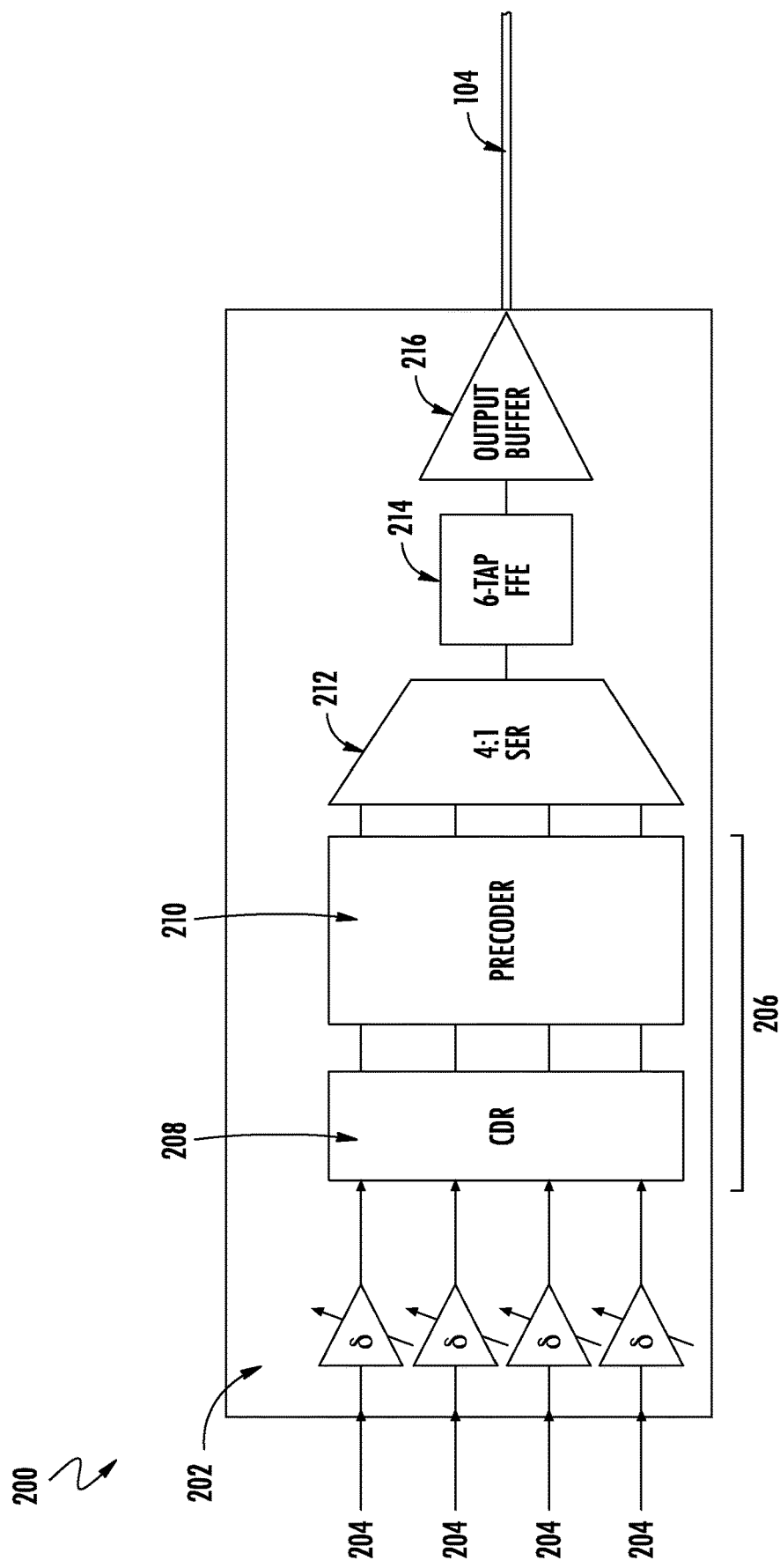
FIG. 2 is a schematic view of a copper communication module according to an example embodiment.

With reference to FIG. 2, an example copper communication module 200 (e.g., module 200) for networking connections is illustrated. The copper communication module 200 may, for example, be provided in the connector 102 of the cable connector 100 shown in FIG. 1.

As shown, the module 200 may include a plurality of first electrical signal generators 204, a first signal modulation system 206, a first active copper multiplexer 212, and, in some embodiments, equalizing circuitry 214 and/or buffering circuitry 216. In some example embodiments, as shown in FIG. 2, the module 200 may include four (4) first electrical signal generators 204 configured to generate an electrical signal. As such, the embodiment illustrated in FIG. 2 may be configured to combine (as described hereafter) four (4) electrical signals into a single combined electrical signal for transmission via the copper cable 104. Although the present disclosure contemplates that other arrangements, configurations, etc. may utilize various additional signal generators (e.g., in sequence or parallel) based upon the intended application, the embodiments hereafter are described with reference to four (4) electrical signal generators for the sake of clarity of description. By way of example, in some embodiments an eight (8) channel system may be employed that includes eight (8) electrical signal generators.

With continued reference to FIG. 2, the module 200 may include a plurality of first electrical signal generators 204 configured to generate respective electrical signals. As shown, the plurality of first electrical signal generators 204 may each be configured to generate repeating or non-repeating electrical signals (e.g., analog or digital) and may include one or more function generators, RF signal generators, microwave signal generators, pitch generators, arbitrary waveform generators, digital pattern generators, and/or frequency generators. By way of example, the plurality of first electrical signal generators 204 may be configured to generate electrical signals encoded via non-return-to-zero (NRZ) techniques. As would be evident to one of ordinary skill in the art in light of the present disclosure, NRZ encoding refers to a binary code (e.g., base-2 numeral system) in which ones are represented by a positive voltage and zeros are represented by a negative voltage. The present disclosure contemplates that any method for NRZ encoding (e.g., unipolar NRZ level, bipolar NRZ level, NRZ space, NRZ inverted, and/or randomized NRZ) may be used by the first electrical signal generators 204 based upon the intended application of the module 200. In some embodiments, each of the electrical signals generated by the plurality of electrical signal generators 204 may have a bandwidth of 25 Gb/s or 50 Gb/s.

The module 200 may further include a first signal modulation system 206 that includes first clock and data recovery (CDR) circuitry 208 and first precoding circuitry 210 configured to receive the electrical signals generated by the first electrical signal generators 204. The first signal modulation system 206, in conjunction with the plurality of first electrical signal generators 204, may be configured to modulate each of the electrical signals such that each modulated electrical signal is distinguishable from the other modulated electrical signals. As would be evident to one of ordinary skill in the art in light of the present disclosure, in order to properly distinguish electrical signals (e.g., following multiplexing of the signals as described hereafter), modulation techniques (e.g., pulse modulation, amplitude modulation, frequency modulation, etc.) may be used to sufficiently distinguish each electrical signal from one another. In some embodiments, the first electrical signal generators 204 may perform some or all of the signal modulation (e.g., as facilitated by the first CDR circuitry 208 and first precoding circuitry 210). In other embodiments, the signals generated by the plurality of first electrical signal generators 204 may be received by the first signal modulation system 206 and modulated via the first CDR circuitry 208 and/or the first precoding circuitry 210. As would be evident to one of ordinary skill in the art in light of the present disclosure, the first CDR circuitry 208 may be configured to receive a high bandwidth/speed data stream (e.g., electrical signals from the first electrical signal generators 204) and generate a clock or equivalent timing that approximates the frequency of the data stream. The first CDR circuitry 208 may further phase-align the clock to one or more transitions in the data stream.

With continued reference to FIG. 2, the module 200 may further include first precoding circuitry 210 configured to, in conjunction with the first CDR circuitry 208, modulate each of the electrical signals such that each modulated electrical signal is distinguishable from the other modulated electrical signals. As would be evident to one of ordinary skill in the art in light of the present disclosure, the first precoding circuitry 210 may be configured to appropriately weight (e.g., phase, gain, etc.) the electrical signals for further combining (e.g., multiplexing) of the electrical signals as described hereafter. In some embodiments, the first signal modulation system 206 (e.g., first CDR circuitry 208 and first precoding circuitry 210) in conjunction with the plurality of first electrical signal generators 204 may be configured to modulate the electrical signals via pulse amplitude modulation 4-level (PAM4) techniques. As would be evident to one of ordinary skill in the art in light of the present disclosure, PAM4 techniques may operate to substantially double the data rate for electrical signals as compared to NRZ techniques. Said differently, PAM4 defines a multilevel signal modulation format (e.g., 4 levels) as opposed to the two states offered by NRZ techniques.

As described above, in some instances, the plurality of first electrical signal generators 204 may be configured to generate electrical signals encoded via NRZ techniques. In such an embodiment, the first signal modulation system 206 (e.g., first CDR circuitry 208, first precoding circuitry 210) may be configured to further modulate the electrical signals via PAM4 (e.g., NRZ to PAM4 techniques). In embodiments in which the first electrical signal generators 204 generate electrical signal according to PAM4 techniques, the first CDR circuitry 208 and/or first precoding circuitry 210 may be configured to prepare (e.g., by clocking, amplifying, etc.) these electrical signals for combining as described hereafter. While described and illustrated herein as distinct elements, the present disclosure contemplates that the first electrical signal generators 204 may, in some embodiments, include the first signal modulation system 206 (e.g., first CDR circuitry 208 and/or first precoding circuitry 210). As described above, in instances in which the module 200 includes four (4) electronic signal generators 204, the first signal modulation system 206 is configured to receive four electrical signals from the four electrical signal generators 204 and modulate each of the four electrical signals.

With continued reference to FIG. 2, the module 200 may further include a first active copper multiplexer 212 (e.g., multiplexer 212) in electrical communication with the plurality of first electrical signal generators 204. The multiplexer 212 may be configured to receive a plurality of modulated electrical signals from the first signal modulation system 206 and combine the plurality of modulated signals into a single combined electrical signal including multiple modulated electrical signals. As would be evident to one of ordinary skill in the art in light of the present disclosure, the multiplexer 212 may include circuitry configured to receive several electrical signal inputs (e.g., analog or digital) and forward the signals to a single output (e.g., copper cable 104). For example, the multiplexer 212 may include combinational logic circuitry that receives the modulated electrical signals and applies a control signal to output various input signals (e.g., channels) one at a time to the output (e.g., single copper cable 104). The multiplexer 212 may include any number of high-speed logic gates, switches, transistors, and/or metal-oxide-semiconductor field-type transistors (MOSFETs) configured to perform the combination of the modulated signals described herein for output.

In some embodiments and as described above, the plurality of first electrical signal generators 204 may generate electrical signals having a bandwidth of 25 Gb/s. In such an embodiment, the multiplexer 212 may be configured to receive the four modulated electrical signals from the first signal modulation system 206 and combine the four modulated signals into a single combined electrical signal having a bandwidth of at least 100 Gb/s. Similarly, the plurality of first electrical signal generators 204 may generate electrical signals having a bandwidth of 50 Gb/s. In such an embodiment, the multiplexer 212 may be configured to receive the four modulated electrical signals from the first signal modulation system 206 and combine the four modulated signals into a single combined electrical signal (e.g., the first combined electrical signal) having a bandwidth of at least 200 Gb/s. While described herein with reference to a first combined electrical signal having a bandwidth of at least 100 Gb/s and at least 200 Gb/s, the present disclosure contemplates that the multiplexer 212 may be configured to receive electrical signals from the first signal modulation system 206 (e.g., generated by the first electrical signal generators) having any bandwidth and output a first combined electrical signal having a bandwidth substantially equivalent to the sum of the bandwidth associated with the individual electrical signals.

In some instances, the module 200 may further include first equalizing circuitry 214 and/or first buffering circuitry 216. The first equalizing circuitry 214 (e.g., a 6-tap feed forward equalizer (FFE)) may be configured to reduce interference and associated channel loss. Said differently, the first equalization circuitry 214 may be configured to reduce intersymbol interference in digital communication systems (e.g., module 200) such that the electrical signals received by networking components communicably coupled with the module 200 are substantially the same (e.g., without group and/or phase delay) as compared to the electrical signal generated by the module 200. Additionally, the module 200 may include first buffering circuitry 216 (e.g., output/buffer) configured to isolate the output (e.g., the multiplexed/combined electrical signal) from any electrical signal inputs (e.g., multiplexed electrical signals transmitted to the module 200 via the copper cable 104). The multiplexed electrical signals (e.g., combined modulated electrical signals) may then be transmitted by the module 200 as a single combined electrical signal (e.g., the first combined electrical signal) through the single copper cable 104.

Figure 3:
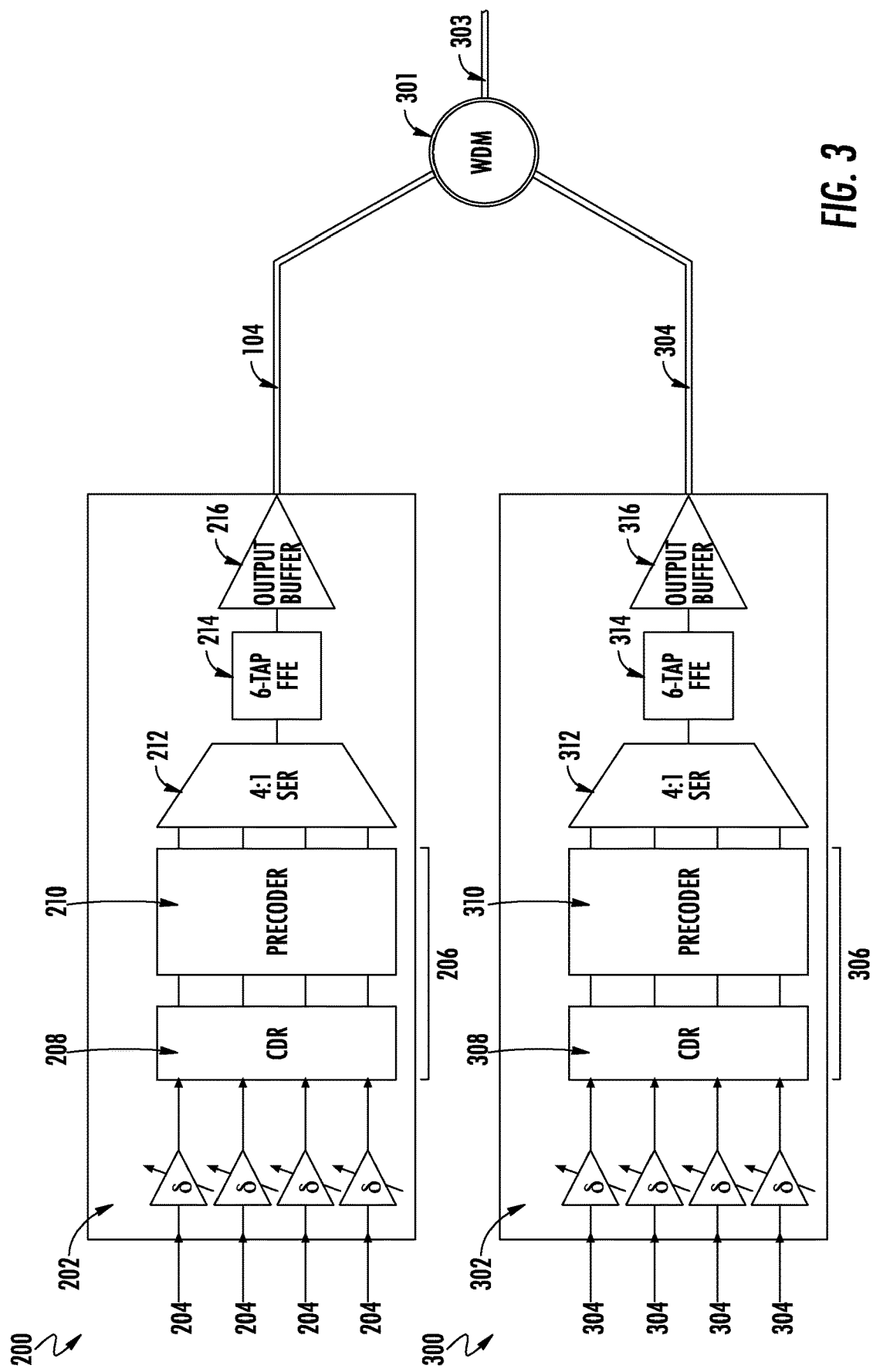
FIG. 3 is a schematic view of an example communication system including the copper communication module of FIG. 2 according to an example embodiment.

With reference to FIG. 3, an example communication system including the copper communication module 200 of FIG. 2 (e.g., first module 200) in conjunction with a second copper communication module 300 (e.g., second module 300) is illustrated. Similar to the first module 200, the second module 300 may include a plurality of second electrical signal generators 304, a second signal modulation system 306 (e.g., second CDR circuitry 308 and/or second precoding circuitry 310), a second active copper multiplexer 312, and, in some embodiments, second equalizing circuitry 314 and/or second buffering circuitry 316. As shown in FIG. 3, the module 300 may also include four (4) second electrical signal generators 304 configured to generate an electrical signal. As such, the module 300 illustrated in FIG. 3 may be configured to combine four (4) electrical signals into a single combined electrical signal for transmission via the copper cable 305.

The second module 300 may include a plurality of second electrical signal generators 304 configured to generate repeating or non-repeating electrical signals (e.g., analog or digital) and may include one or more function generators, RF signal generators, microwave signal generators, pitch generators, arbitrary waveform generators, digital pattern generators, and/or frequency generators. By way of example, the plurality of second electrical signal generators 304 may be configured to generate electrical signals encoded via non-return-to-zero (NRZ) techniques as described above with reference to FIG. 2. In some embodiments, each of the electrical signals generated by the plurality of second electrical signal generators 304 may have a bandwidth of 25 Gb/s or 50 Gb/s.

The module 300 may further include a second signal modulation system 306 that includes second clock and data recovery (CDR) circuitry 208 and second precoding circuitry 310 configured to receive the electrical signals generated by the second electrical signal generators 304. The second signal modulation system 306, in conjunction with the plurality of first electrical signal generators 304, may be configured to modulate each of the electrical signals such that each modulated electrical signal is distinguishable from the other modulated electrical signals. In some embodiments, the second electrical signal generators 304 may perform some or all of the signal modulation (e.g., as facilitated by the second CDR circuitry 308 and second precoding circuitry 310).

As described above, the second CDR circuitry 308 may be configured to receive a high bandwidth/speed data stream (e.g., electrical signals from the second electrical signal generators 304) and generate a clock or equivalent timing that approximates the frequency of the data stream. The second CDR circuitry 308 may further phase-align the clock to one or more transitions in the data stream. The second precoding circuitry 310 may be configured to appropriately weight (e.g., phase, gain, etc.) the electrical signals for further combining (e.g., multiplexing) of the electrical signals as described hereafter. In some embodiments, the second signal modulation system 306 (e.g., the second CDR circuitry 308 and the second precoding circuitry 310) in conjunction with the plurality of second electrical signal generators 304 may be configured to modulate the electrical signals via pulse amplitude modulation 4-level (PAM4) techniques.

The module 300 may further include a second active copper multiplexer 312 (e.g., multiplexer 312) in electrical communication with the plurality of second electrical signal generators 304. The multiplexer 312 may be configured to receive a plurality of modulated electrical signals from the second signal modulation system 306 and combine the plurality of modulated signals into a single combined electrical signal comprising multiple modulated electrical signals as described above with reference to the multiplexer 212 in FIG. 2. In some embodiments, as described above, the plurality of second electrical signal generators 304 may generate electrical signals having a bandwidth of 25 Gb/s. In such an embodiment, the multiplexer 312 may be configured to receive the four modulated electrical signals from the second signal modulation system 306 and combine the four modulated signals into a second combined electrical signal having a bandwidth of at least 100 Gb/s. Similarly, the plurality of second electrical signal generators 304 may generate electrical signals having a bandwidth of 50 Gb/s. In such an embodiment, the multiplexer 312 may be configured to receive the four modulated electrical signals from the second signal modulation system 306 and combine the four modulated signals into a second combined electrical signal having a bandwidth of at least 200 Gb/s.

In some instances, the module 300 may further include second equalizing circuitry 314 and/or second buffering circuitry 316. As described above, the second equalizing circuitry 314 (e.g., a 6-tap feed forward equalizer (FFE)) may be configured to reduce interference and associated channel loss. Additionally, the module 300 may include second buffering circuitry 316 (e.g., output/buffer circuitry) configured to isolate the output (e.g., the multiplexed/combined electrical signal) from any electrical signal inputs (e.g., the multiplexed electrical signals transmitted to the module 300 via the copper cable 305). The multiplexed electrical signals (e.g., the combined modulated electrical signals) may then be transmitted by the module 300 as a second combined electrical signal through the single copper cable 305.

With continued reference to FIG. 3, the communications system may further include a system multiplexer 301 in electrical communication with the first module 200 via the copper cable 104 and in electrical communication with the second module 300 via the copper cable 305. As shown, the system multiplexer 301 may combine the first combined electrical signal (e.g., the output of module 200) and the second combined electrical signal (e.g., the output of module 300) into a third combined electrical signal for transmission through a copper cable 303 (e.g., a single copper cable output of the illustrated communication system). The system multiplexer 301 may operate substantially the same as first active copper multiplexer 212 and second active copper multiplexer 312 in that the system multiplexer 301 may be configured to receive the first combined electrical signal from module 200 and the second combined electrical signal from module 300 and combine the modulated and multiplexed signals into a single combined electrical signal (e.g., a third combined electrical signal). As described above, the system multiplexer 301 may include circuitry configured to receive several electrical signal inputs (e.g., analog or digital) and forward the signals to a single output (e.g., the copper cable 303).

In some embodiments, as described above, the output of the module 200 and the module 300 (e.g., first and second combined electrical signals, respectively) may each have a bandwidth of 100 Gb/s. In such an embodiment, the system multiplexer 301 may be configured to combine the first combined electrical signal and the second combined electrical signal into a third combined electrical signal having a bandwidth of at least 200 Gb/s. In other embodiments, as described above, the output of the module 200 and the module 300 (e.g., the first and second combined electrical signals, respectively) may each have a bandwidth of 200 Gb/s. In such an embodiment, the system multiplexer 301 may be configured to combine the first combined electrical signal and the second combined electrical signal into a third combined electrical signal having a bandwidth of at least 400 Gb/s. In this way, the embodiments of the present application utilize emerging copper materials and novel signal manipulation techniques to provide copper communication systems with increased bandwidth and reduced copper material (e.g., by reducing the width of copper cabling) not found in conventional networking connections.

Figure 4:
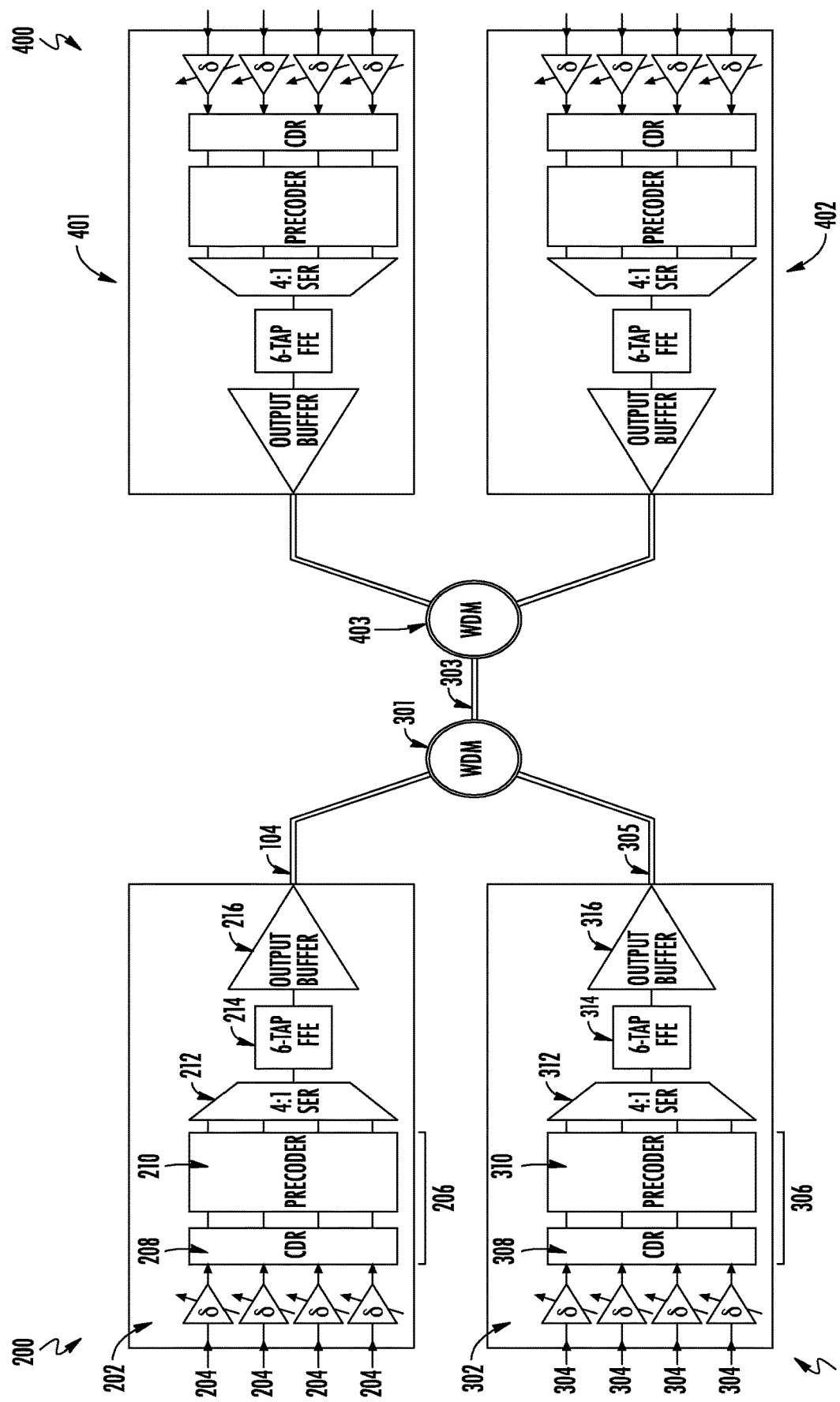
FIG. 4 is a schematic view of the communication system of FIG. 3 in an operational configuration according to an example embodiment.

With reference to FIG. 4, a schematic view of the communication system of FIG. 3 in an operational configuration is illustrated. As shown, the communication system 400 includes the first module 200 and the second module 300 in electrical communication with the system multiplexer 301 via the copper cable 104 and the copper cable 305, respectively. During operation, the first module 200 and the second module 300 may each generate four (4) electrical signals (e.g., 25 Gb/s, 50 Gb/s, etc.) that are modulated and multiplexed to form a first combined electrical signal and a second combined electrical signal, respectively. The first combined electrical signal may be transmitted from the module 200 to the system multiplexer 301 via the copper cable 104. Similarly, the second combined electrical signal may be transmitted from the module 300 to the system multiplexer 301 via the copper cable 305. The system multiplexer 301 may combine the first combined electrical signal with the second combined electrical signal to form the third combined electrical signal. The third combined electrical signal may be transmitted via the copper cable 303 to one or more modules (e.g., the modules 401 and 402) in electrical communication with the system multiplexer 301. For example, a corresponding multiplexer 403 of the communications system 400 may operate as a demultiplexer so as to separate the third combined electrical signal received via the copper cable 303 into respective electrical signals for transmission to the module 401 and/or the module 402.

Similarly, the modules 401, 402 may also generate combined electrical signals (e.g., via similar components to modules 200, 300) and transmit the combined electrical signals to the multiplexer 403. In such an embodiment, the multiplexer 403 may operate to combine the combine electrical signals from modules 401 and 402 into a single electrical signal for transmission via the copper cable 303. As such, the system multiplexer 301 may receive the combined electrical signal and operate as a demultiplexer configured to separate electrical signals from the multiplexer 403 for transmission to module 200 and/or 300.

Example Method of Transmission

Figure 5:
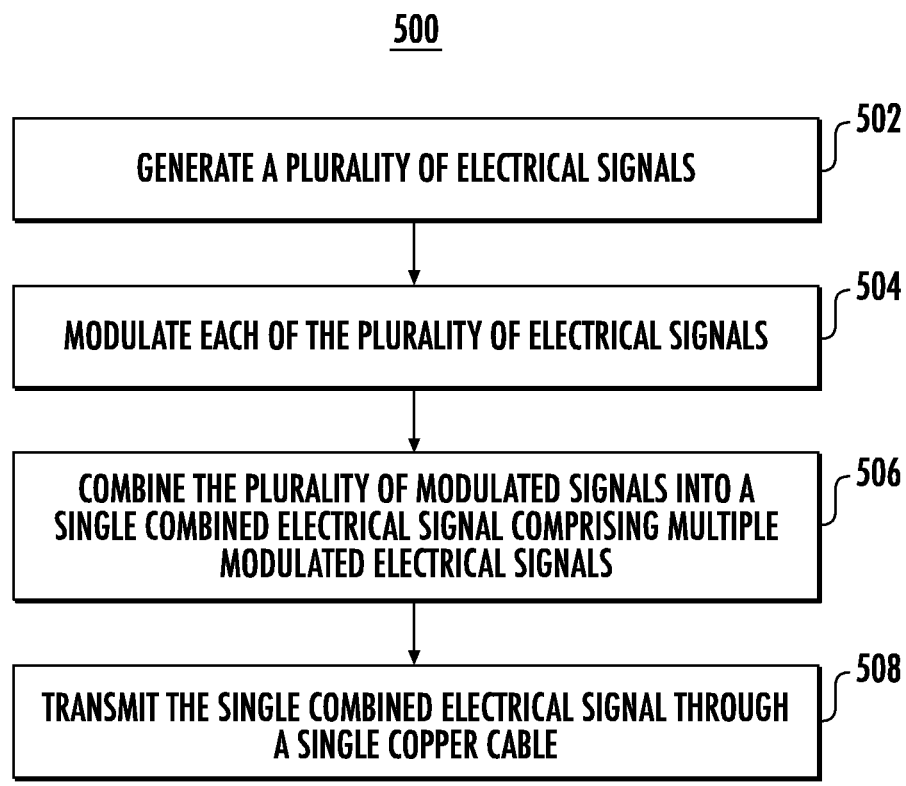
FIG. 5 is a method for transmitting signals over copper media according to an example embodiment.

With reference to FIG. 5, a method for transmitting signals over copper media according to embodiments of the invention is illustrated. The method 500 may include generating a plurality of electrical signals at Block 502. As described above, a plurality of electrical signal generators may each be configured to generate repeating or non-repeating electrical signals (e.g., analog or digital) and may include one or more function generators, RF signal generators, microwave signal generators, pitch generators, arbitrary waveform generators, digital pattern generators, and/or frequency generators. For example, a plurality of first electrical signal generators may be configured to generate electrical signals encoded via non-return-to-zero (NRZ) techniques. In some embodiments, each of the electrical signals generated by the plurality of electrical signal generators at Block 502 may have a bandwidth of 25 Gb/s or 50 Gb/s.

The method 500 may further include modulating each of the plurality of electrical signals such that each modulated electrical signal is distinguishable from the other modulated electrical signals at Block 504. As described above, the plurality of electronic signal generators, CDR circuitry, and/or precoding circuitry may operate signal modulation circuitry to modulate each of the electrical signals such that each modulated electrical signal is distinguishable from the other modulated electrical signals. In order to properly distinguish electrical signals, modulation techniques (e.g., pulse modulation, amplitude modulation, frequency modulation, etc.) may be used to sufficiently distinguish the electrical signals from one another. In some embodiments, at Block 504, CDR circuitry may receive a high bandwidth/speed data stream (e.g., electrical signals from the electrical signal generators) and generate a clock or equivalent timing that approximates the frequency of the data stream. The CDR circuitry may further phase-align the clock to one or more transitions in the data stream. In other embodiments, the precoding circuitry may be configured to appropriately weight (e.g., phase, gain, etc.) the electrical signals for further combining (e.g., multiplexing) of the electrical signals as described hereafter.

The method 500 may further include combining the plurality of modulated signals into a single combined electrical signal comprising multiple modulated electrical signals at Block 506. As described above, an active copper multiplexer in electrical communication with the plurality of electrical signal generators and signal modulation system may combine the plurality of modulated signals into a single combined electrical signal comprising multiple modulated electrical signals. As such, the multiplexer may include circuitry configured to receive several electrical signal inputs (e.g., analog or digital) and forward the signals to a single output as described above. For example, the multiplexer may include combinational logic circuitry that receives the modulated electrical signals and applies a control signal to output various input signals (e.g., channels), one at a time, to the output (e.g., the single copper cable).

The method 500 may further include transmitting the single combined electrical signal through a single copper cable at Block 508. By way of example, in some embodiments, the active copper multiplexer may be configured to receive four modulated electrical signals from the signal modulation system and combine the four modulated signals into a single combined electrical signal having a bandwidth of at least 200 Gb/s. The single combined electrical signal (e.g., 200 Gb/s) may then be transmitted over a single copper wire and received by corresponding circuitry, modules, and/or other networking components as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A communication system for transmitting signals over copper media, the system comprising:
a first module comprising:

a first plurality of electrical signal generators, wherein each first electrical signal generator is configured to generate an electrical signal;

a first signal modulation system, wherein the first signal modulation system is configured to:
  receive the electrical signals generated by the first electrical signal generators; and
  modulate each of the electrical signals such that each modulated electrical signal is distinguishable from the other modulated electrical signals;

a first active copper multiplexer in electrical communication with the plurality of first electrical signal generators, wherein the first active copper multiplexer is configured to:
  receive a plurality of modulated electrical signals from the first signal modulation system, and
  combine the plurality of modulated signals into a first combined electrical signal comprising multiple modulated electrical signals;

a second module comprising:
  a second plurality of electrical signal generators, wherein each second electrical signal generator is configured to generate an electrical signal;
  a second signal modulation system, wherein the second signal modulation system is configured to:
    receive the electrical signals generated by the second electrical signal generators; and
    modulate each of the electrical signals such that each modulated electrical signal is distinguishable from the other modulated electrical signals;
  a second active copper multiplexer in electrical communication with the plurality of second electrical signal generators, wherein the second active copper multiplexer is configured to:
    receive a plurality of modulated electrical signals from the second signal modulation system, and
    combine the plurality of modulated signals into a second combined electrical signal comprising multiple modulated electrical signals; and a system multiplexer configured to:
  receive the first combined electrical signal and the second combined electrical signal from the first and second modules, respectively;
  combine the first combined electrical signal and the second combined electrical signal into a third combined electrical signal; and
  transmit the third combined electrical signal through a single copper cable.

2. The communication system according to claim 1, wherein the first module and the second module each comprise four respective electrical signal generators each configured to generate an electrical signal.

3. The communication system according to claim 2, wherein the first signal modulation system is further configured to receive four electrical signals from the four first electrical signal generators and modulate each of the four electrical signals, and the second signal modulation system is further configured to receive four electrical signals from the four second electrical signal generators and modulate each of the four electrical signals.

4. The communication system according to claim 2, wherein each electrical signal has a bandwidth of at least 25 Gb/s.

5. The communication system according to claim 4, wherein:
  the first active copper multiplexer is further configured to:
    receive the four modulated electrical signals from the first signal modulation system, and
    combine the four modulated signals into the first combined electrical signal having a bandwidth of at least 100 Gb/s; and
  the second active copper multiplexer is further configured to:
    receive the four modulated electrical signals from the second signal modulation system, and
    combine the four modulated signals into the second combined electrical signal having a bandwidth of at least 100 Gb/s.

6. The communication system according to claim 5, wherein the system multiplexer is further configured to combine the first combined electrical signal and the second combined electrical signal such that the third combined electrical signal has a bandwidth of at least 200 Gb/s.

7. The communication system according to claim 2, wherein each electrical signal has a bandwidth of at least 50 Gb/s.

8. The communication system according to claim 7, wherein:
  the first active copper multiplexer is further configured to:
    receive the four modulated electrical signals from the first signal modulation system, and
    combine the four modulated signals into the first combined electrical signal having a bandwidth of at least 200 Gb/s; and
  the second active copper multiplexer is further configured to:
    receive the four modulated electrical signals from the second signal modulation system, and
    combine the four modulated signals into the second combined electrical signal having a bandwidth of at least 200 Gb/s.

9. The communication system according to claim 8, wherein the system multiplexer is further configured to combine the first combined electrical signal and the second combined electrical signal such that the third combined electrical signal has a bandwidth of at least 400 Gb/s.

10. A method for transmitting signals over copper media, the method comprising:
  generating, via a first plurality of electrical signal generators of a first module, a first plurality of electrical signals;
  modulating, via a first signal modulation system of the first module, each of the first plurality of electrical signals such that each modulated electrical signal of the first module is distinguishable from the other modulated electrical signals of the first module;
  combining, via a first active copper multiplexer of the first module, the plurality of modulated signals of the first module into a first combined electrical signal comprising multiple modulated electrical signals of the first module;
  generating, via a second plurality of electrical signal generators of a second module, a second plurality of electrical signals;
  modulating, via a second signal modulation system of the second module, each of the second plurality of electrical signals such that each modulated electrical signal of the second module is distinguishable from the other modulated electrical signals of the second module;
  combining, via a second active copper multiplexer of the second module, the plurality of modulated signals of the second module into a second combined electrical signal comprising multiple modulated electrical signals of the second module, and combining, via a system multiplexer coupled with the first module and the second module, the first combined electrical signal and the second combined electrical signal into a third combined electrical signal; and transmitting, via the system multiplexer, the third combined electrical signal through a single copper cable.

11. The method according to claim 10, wherein the first module and the second module each comprise four respective electrical signal generators each configured to generate an electrical signal.

12. The method according to claim 11, wherein modulating each of the plurality of electrical signals further comprises:

modulating, via the first signal modulation system of the first module, four electrical signals from the first electrical signal generators; and modulating, via the second signal modulation system of the second module, four electrical signals from the second electrical signal generators.

13. The method according to claim 11, wherein each electrical signal has a bandwidth of at least 25 Gb/s.

14. The method according to claim 13, wherein the first combined electrical signal has a bandwidth of at least 100 Gb/s and the second combined electrical signal has a bandwidth of at least 100 Gb/s.

15. The method according to claim 14, wherein the third combined electrical signal has a bandwidth of at least 200 Gb/s.

16. The method according to claim 11, wherein each electrical signal of the first module and of the second module has a bandwidth of at least 50 Gb/s.

17. The method according to claim 16, wherein the first combined electrical signal has a bandwidth of at least 200 Gb/s and the second combined electrical signal has a bandwidth of at least 200 Gb/s.

18. The method according to claim 17, wherein the third combined electrical signal has a bandwidth of at least 400 Gb/s.

* * * * *